United States Patent
Ma et al.

(10) Patent No.: US 6,731,315 B1
(45) Date of Patent: May 4, 2004

(54) METHOD FOR SELECTING DISPLAY PARAMETERS OF A MAGNIFIABLE CURSOR

(75) Inventors: William A. Ma, Wappingers Falls, NY (US); Wayne M. Delia, Poughkeepsie, NY (US); William H-L Ma, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,531

(22) Filed: Nov. 30, 1999

(51) Int. Cl.$^7$ ................................................ G06F 3/00
(52) U.S. Cl. ...................... 345/856; 345/810; 345/841; 345/159
(58) Field of Search ................................ 345/764, 808, 345/810, 841, 843, 856, 159, 781, 788, 790, 791, 801, 800, 661, 665, 667, 619, 629, 634

(56) References Cited

U.S. PATENT DOCUMENTS

| | | | |
|---|---|---|---|
| 4,110,925 A | 9/1978 | Strand et al. | 40/466 |
| 4,428,065 A * | 1/1984 | Duvall et al. | 707/7 |
| 5,157,768 A * | 10/1992 | Hoeber et al. | 345/711 |
| 5,341,466 A * | 8/1994 | Perlin et al. | 345/668 |
| 5,384,909 A | 1/1995 | Brown | 395/155 |
| 5,493,641 A | 2/1996 | Brown | 395/155 |
| 5,548,702 A | 8/1996 | Li et al. | 395/155 |
| 5,559,946 A | 9/1996 | Porter | 395/157 |
| 5,611,060 A | 3/1997 | Belfiore et al. | 395/341 |
| 5,625,782 A | 4/1997 | Soutome et al. | 395/341 |
| 5,638,523 A | 6/1997 | Mullet et al. | 395/326 |
| 5,664,127 A | 9/1997 | Anderson et al. | 345/333 |
| 5,721,852 A | 2/1998 | Porter | 395/349 |
| 5,726,687 A | 3/1998 | Belfiore et al. | 345/345 |
| 5,874,936 A | 2/1999 | Berstis et al. | 345/123 |
| 5,969,706 A * | 10/1999 | Tanimoto | 345/671 |
| 5,973,694 A * | 10/1999 | Steele et al. | 345/835 |
| 6,073,036 A * | 6/2000 | Heikkinen et al. | 455/575 |
| 6,184,859 B1 * | 2/2001 | Kojima | 345/629 |
| 6,288,702 B1 * | 9/2001 | Tachiban et al. | 345/671 |
| 6,288,720 B1 * | 9/2001 | Zimmerman et al. | 345/810 |
| 6,359,615 B1 * | 3/2002 | Singh | 345/173 |

OTHER PUBLICATIONS

Pending patent application No. 09/046,830.

* cited by examiner

Primary Examiner—John Cabeca
Assistant Examiner—Kieu D. Vu
(74) Attorney, Agent, or Firm—James J. Cioffi

(57) ABSTRACT

A computer display system which displays an image and a magnified portion of the image. The magnified portion of the image is selected un,der control of a pointing device connected to the computer. A method is described for changing the characteristics of the magnified portion. A configuration utility which creates the magnified portion of the display includes a menu of display properties for the magnified portion. The properties are selected from the display menu, and each refresh of the area within the magnified portion of the image is refreshed with the selected properties. In a text/browser application, the background color, text color, text style and size may be selected differently than the remaining portion of the image displayed on the computer display.

11 Claims, 5 Drawing Sheets

METHOD FOR SELECTING DISPLAY PARAMETERS OF A MAGNIFIABLE CURSOR

CROSS REFERENCE TO RELATED APPLICATIONS

This application is related to U.S. patent application Ser. No. 09/046,830.

BACKGROUND OF THE INVENTION

The invention relates generally to computer display systems which have a sliding window for selecting a portion of an image to be magnified. Specifically, a window representing a magnified cursor is generated which is positionable in response to motion of a pointing device. One such system is described more particularly in the aforesaid related patent application. The magnifiable cursor described in the foregoing patent application provides the ability to read small detail on a computer-driven display. The cursor in its normal operation may be used to invoke a magnifiable cursor from a display tool bar on the computer-driven display. Once invoked, the cursor becomes a sliding window which is movable across the display screen. When positioned at a location of interest on the display screen, the slidable window permits viewing of the area under a pseudomagnification, i.e., the detail within the slidable window is expanded to a larger size by using multiple pixels within the slidable window to display the image detail within the slidable window. The ability to change the display scale of certain detail selected by a user should not be application-specific, but rather should be applicable to any browser/editor application independent of the operating system of the computer display system.

When positioning a magnifiable cursor over the display screen, it is disadvantageous to refresh the screen within the sliding window during the positioning process. Accordingly, as set forth in the aforesaid patent application, the sliding window is greyed in during positioning of the sliding window, by comparing the velocity of movement of the cursor with respect to a nominal threshold value. As the cursor is positioned to a selected location, the velocity decreases below the threshold value and refresh of the screen, particularly in the area of the slidable window, may be effected.

While magnifying a particular portion of a display image is desirable from a number of standpoints, it is also desirable to have properties within a sliding window displayed differently than the remaining portion of the display image. For instance, it may be advantageous to the user to display the portion of the image within the sliding window with different properties, i.e., different colors, text size, or even a different text font than outside of the sliding window. Accordingly, to make full use of the capabilities of the magnifiable cursor, the present invention is directed to controlling these properties of the display image within the sliding window.

SUMMARY OF THE INVENTION

It is an object of this invention to provide a method to change the properties of image detail displayed within a magnifiable cursor.

This and other objects of the invention are provided for by a set of instructions which can be read from a computer readable medium by a computer display system. The computer display system is equipped with a magnifiable cursor which generates a sliding window positionable by a pointing device operated by the user. When the sliding window is located at the user's discretion on a particular detail to be displayed, the detail is magnified by displaying it over a greater number of pixels than detail which is outside of the sliding window. The sliding window has its own set of properties which may be different from those properties of the displayed image outside of the sliding window boundary. Background color, font style and size, of detail within the sliding window are independently controlled from the properties used to display the remaining portion of the image outside of the sliding window.

In accordance with a preferred embodiment of the invention, the selection of the properties for detail displayed within the sliding window may be selected from pull-down menus which are available when the magnifiable cursor is invoked. The pull-down menus can provide selections for background color, text color, font type, or text size as properties to be used to display image detail appearing within the sliding window.

In accordance with one embodiment of the invention, the configuration menu may be selected by the user by clicking a mouse button, which is detected as a signal for invoking the configuration menu. Properties for the magnified portion of the image display may then be selected from the displayed pull-down menu.

DESCRIPTION OF THE PREFERRED EMBODIMENTS

Figure 1:
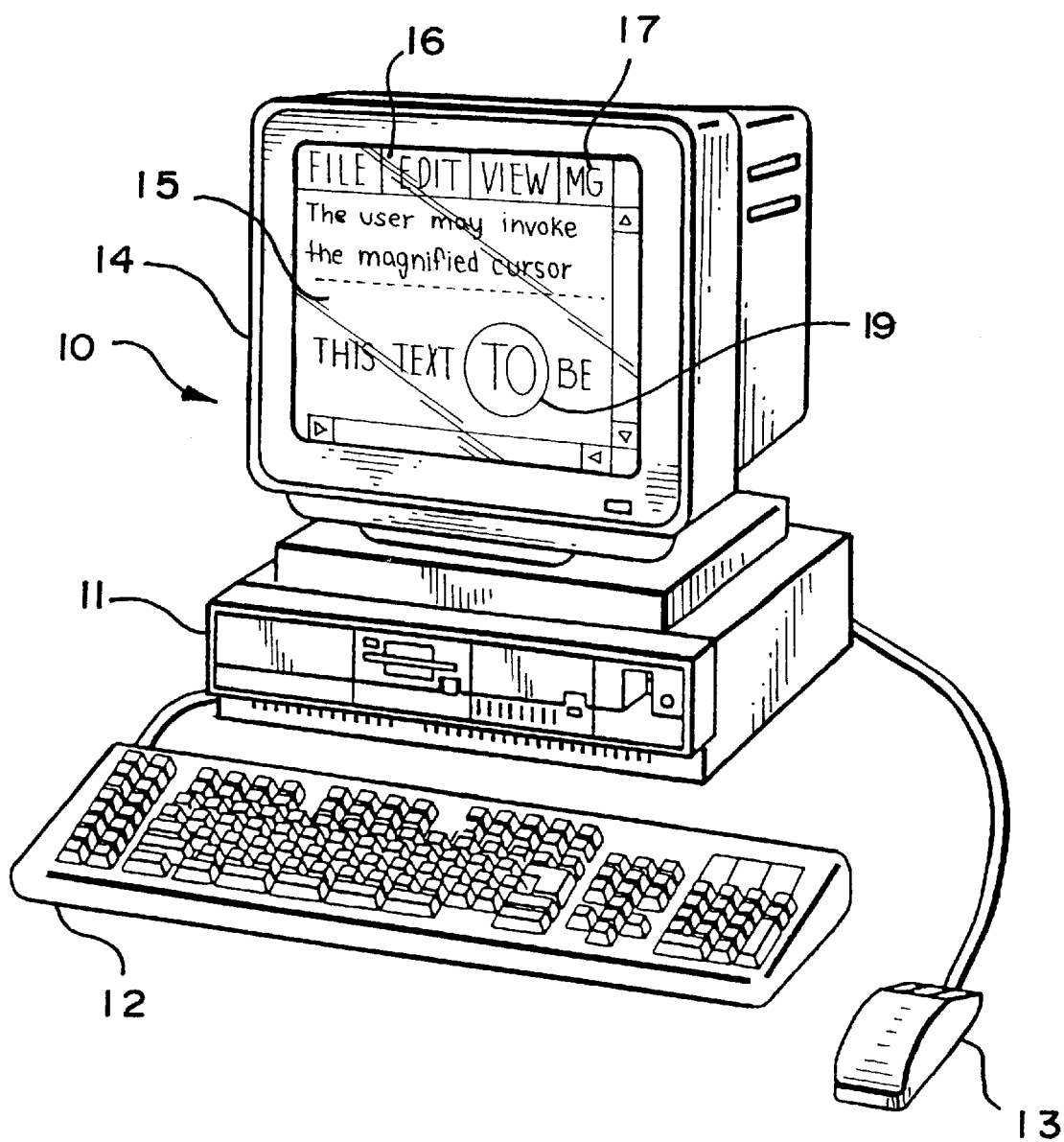
FIG. 1 is an illustration of a magnifiable cursor used in a computer display system.

Referring now to FIG. 1, a computer display system is shown for displaying text in either an editor application or browser application loaded into a personal computer 11. Personal computer 11 is controlled by the user through the keyboard 12 and pointing device (mouse) 13. The display 14 produces a display which has across the top thereof a tool bar 16. Those familiar with the Windows Graphical User Interface will recognize various functions which may be invoked during operation of the editor or browser application for changing text using the tool bar 16.

The tool bar 16 includes an icon 17 which the user may use to invoke a configuration routine for the magnifiable cursor 19. The bulk of the display 15 contains text produced by the editor/browser application. In the embodiment shown, portions of the text may be enlarged using the magnifiable cursor 19. Magnifiable cursor 19 is a sliding window which operates in accordance with the position information transmitted from the mouse 13. The sliding window, shown as a circular boundary 19, results in the displayed material within the boundary of sliding window 19 being expanded in size. The foregoing feature of a magnifiable cursor is described more fully in the above related patent application, hereby incorporated by reference. In accordance with the description of the magnifiable cursor 19 of the related application, various sections of the display screen may be enlarged by the cursor routine executed in the processor 11. As set forth in the previous application, the cursor 19 when moved from one portion of the screen to another, is effectively greyed in so that the screen is not refreshed during movement. Once the cursor (sliding window) is moved to a position of interest, the configuration routine instructions detect the cursor velocity to be below a threshold level, and detail displayed within the boundary of the sliding window 19 is then refreshed.

Figure 2:
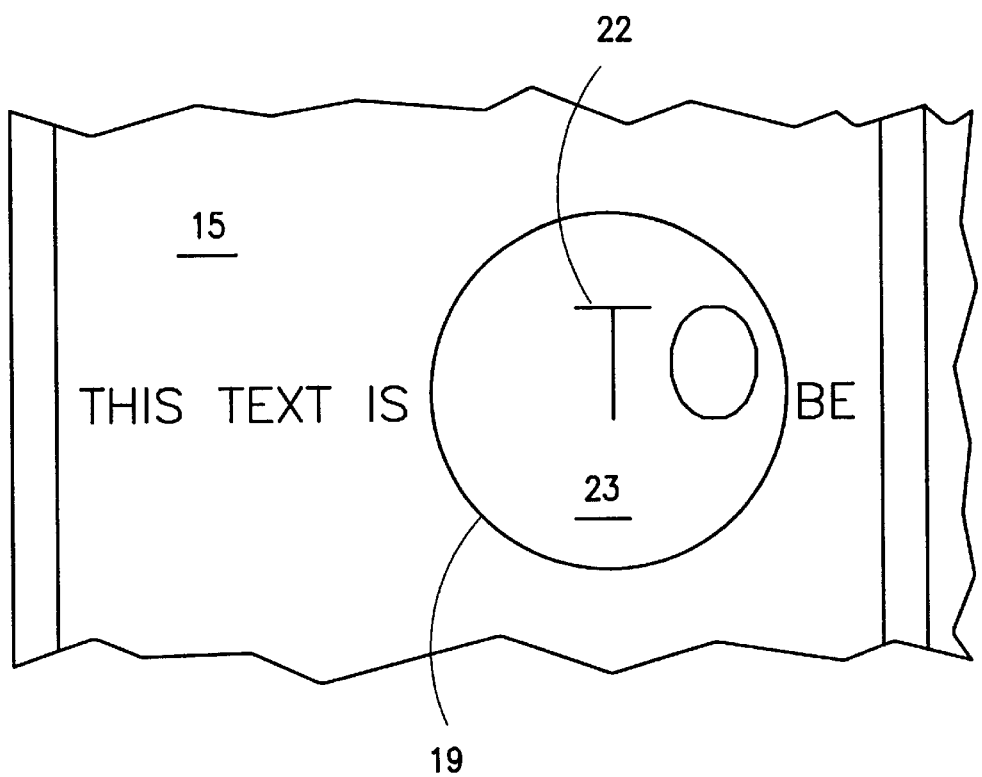
FIG. 2 is an enlarged view of the display screen having a slidable window.

FIG. 2 represents an enlarged view of that portion of the display screen 15 which includes the sliding window 19 enclosing the text TO. The enclosed portion of the display screen 15 includes the background color 23, a font style representing characters 22, as well as a font size and color. In accordance with the present invention, it is possible to set the properties of the display detail within the sliding window boundary 19 to be different from the properties of the display detail outside of the boundary of sliding window 19. In accordance with the preferred embodiment of the invention, the method for changing the properties of the sliding window cursor is implemented as part of the configuration utility for the magnified cursor.

Figure 4A:
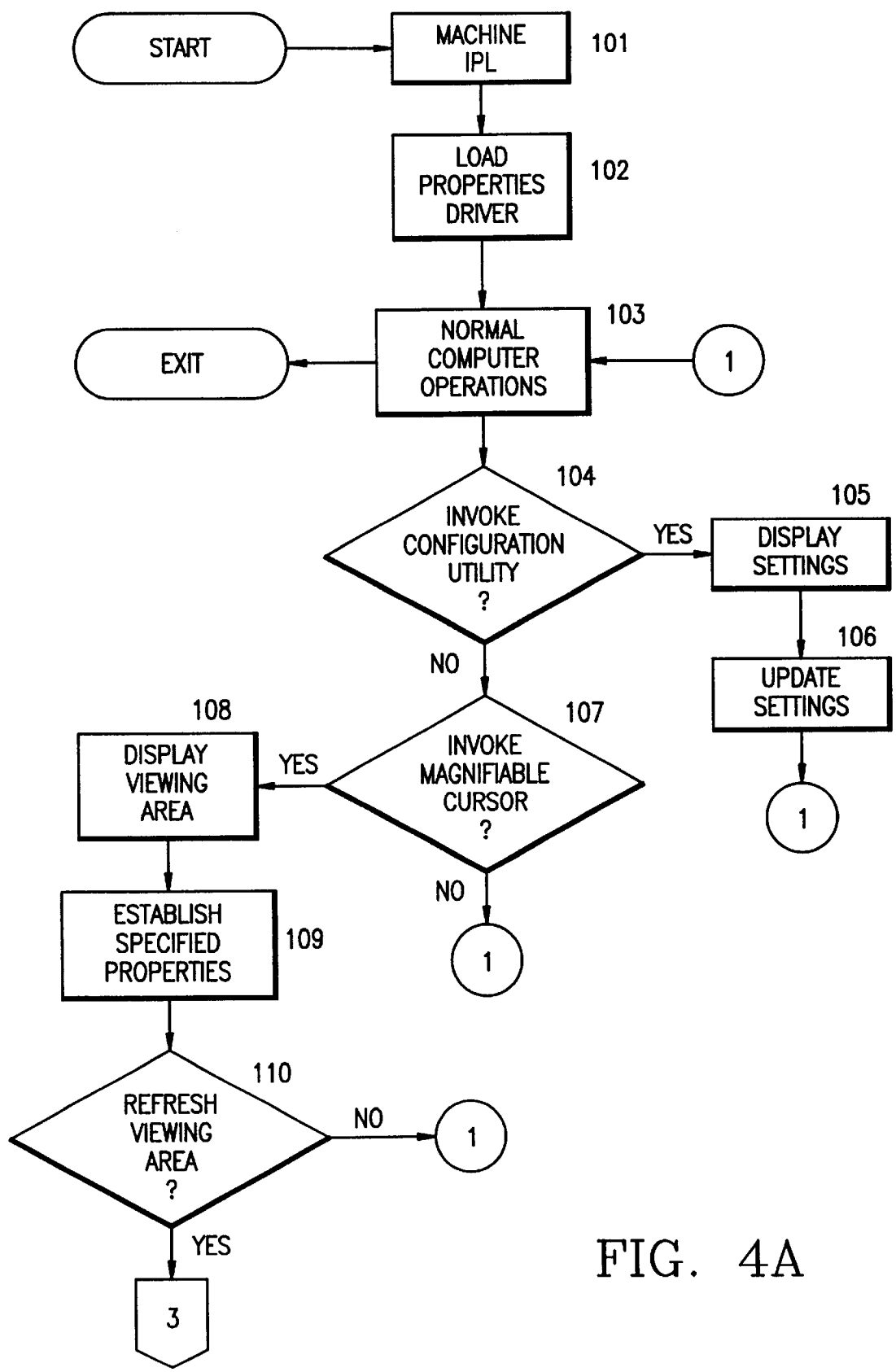
FIG. 4A illustrates the process executed by the computer display system of FIG. 1 when using the magnifiable cursor.

Referring now to FIG. 4A, the process executed by the computer display system is shown as a flowchart. The program load occurs in step 101 during bootup of the personal computer 11 of FIG. 1. A pointing device driver is loaded in step 102 which permits the user to enter commands via the mouse. Once the computer is booted up, it assumes normal computer operations in step 103 under control of the stored instruction set.

If the operator elects to select the magnified cursor, the respective configuration utility is invoked in step 104 by positioning the cursor over icon 17 and depressing a mouse button. If the user has invoked the configuration utility, a set of pull-down menus are available to the user from step 105.

Figure 3:
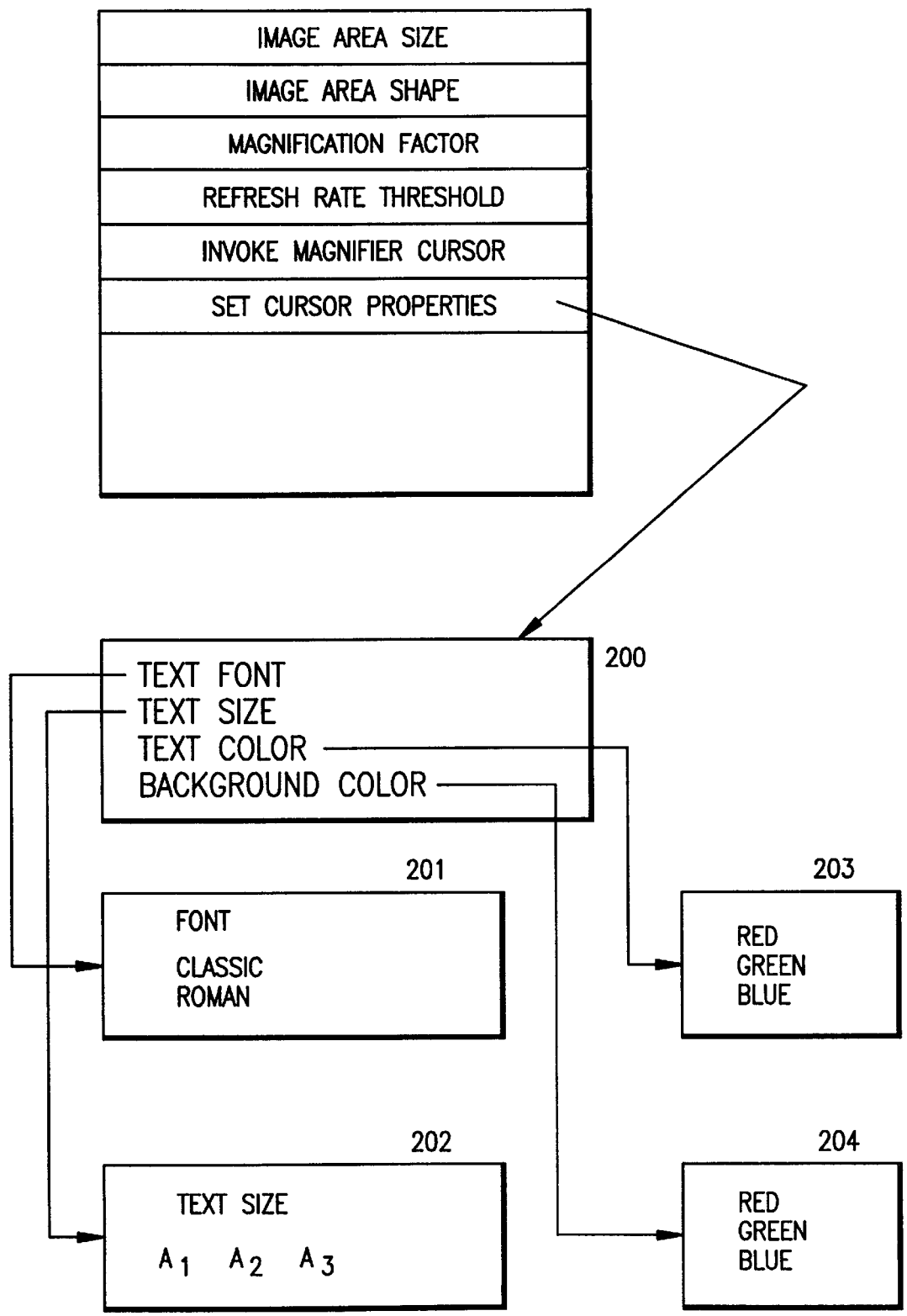
FIG. 3 illustrates the pull-down menu for selecting the sliding window properties.

The respective pull-down menus which are selected in step 105 are shown in FIG. 3. These menus refer to the various attributes and properties associated with image detail which is displayed within the sliding window 19 generated from the magnifiable cursor routine. The display settings illustrated in FIG. 3 include the image area size for the sliding window represented by the magnified cursor, the shape, whether a square, circle, rectangle, etc., magnification factor, i.e., degree to which pixel data within the sliding window is to be expanded, a refresh rate threshold for the information within the sliding window, and a command to invoke the magnifiable cursor.

An additional selection 200 from the initial pull-down menu is selected to set the magnifiable cursor 19 properties. This will include properties within the boundaries of the sliding window such as background color, color of text displayed within the window, text size and font style. Each of the individual cursor properties are selected with additional submenus 201, 202, 203 and 204. As illustrated in FIG. 3, in the case where a text or browser application is being run by the computer 11, a font selection, among the generally used fonts in these applications, such as Classic Roman, etc. may be selected by highlighting the choice with the cursor in submenu 201 and making the selection using the mouse button. Further, the colors for the text can be selected among the primary color, red, green or blue, or any other combination which the system designer may specify, as true for the background color within the boundary of the magnifiable cursor from submenu 203. Text size is similarly selected from a plurality of different sizes in submenu 202.

Following invocation of the configuration utility from operating the mouse button, and selecting and updating the settings in steps 105 and 106, step 107 determines whether the user has requested to invoke the magnifiable cursor by detecting a subsequent click on the icon 17 using the cursor.

If the magnifiable cursor has been invoked, the cursor under control of the pointing device is altered into a sliding window. This results in an expanded cursor size having properties set in step 105 and 106.

Returning to the process of FIG. 4A, step 110 is entered when the sliding window has moved to a position which is determined to be of interest. As set forth in the foregoing related patent application, the refreshed the display detail in this area is effected when the velocity of movement of the sliding window is below a threshold value, indicating that a user has positioned the window in an area of interest on the display screen.

Figure 4B:
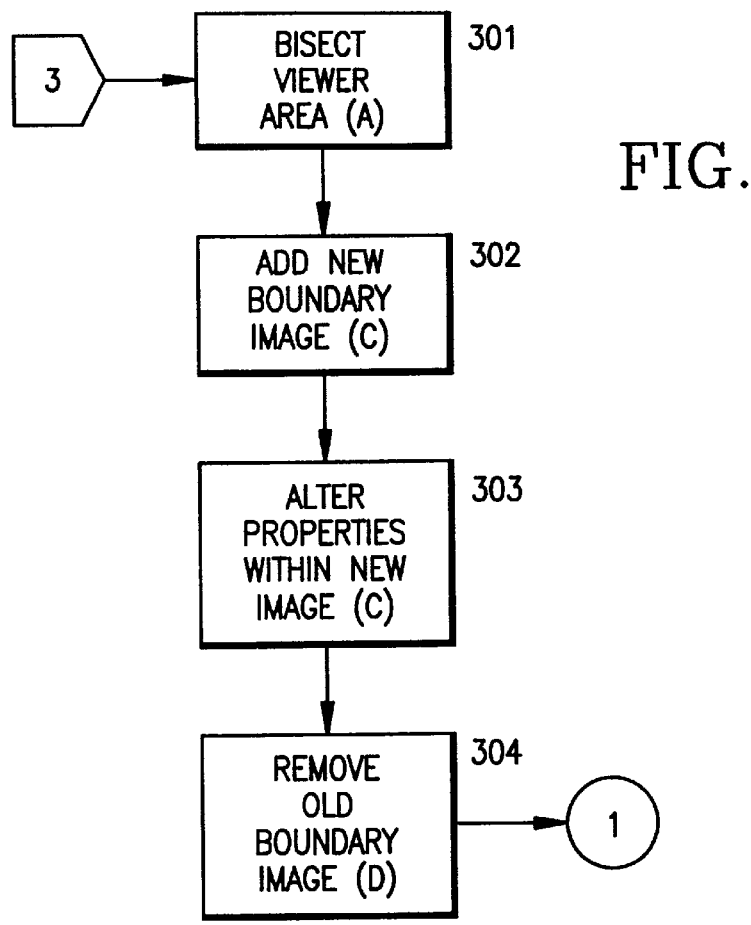
FIG. 4B illustrates the process used to refresh a moving window.

FIG. 4B illustrates how, in accordance with the above related application, the user is able to refresh the area within the sliding window of the magnifiable cursor with a minimum of processing time. Step 301 illustrates the step of bisecting an area within the sliding window 19 with a diagonal B. The cursor movement is determined, in step 302, based on the detected cursor motion factor, and the new area represented by the repositioning of the cursor is added as C to the sliding window in step 302. The properties within the new area C are changed in accordance with those established for the sliding window in step 303. Those properties for image details which are common to the new position of cursor 19 and the old position of cursor 19, represented by 19B, need not be refreshed.

Figure 4C:
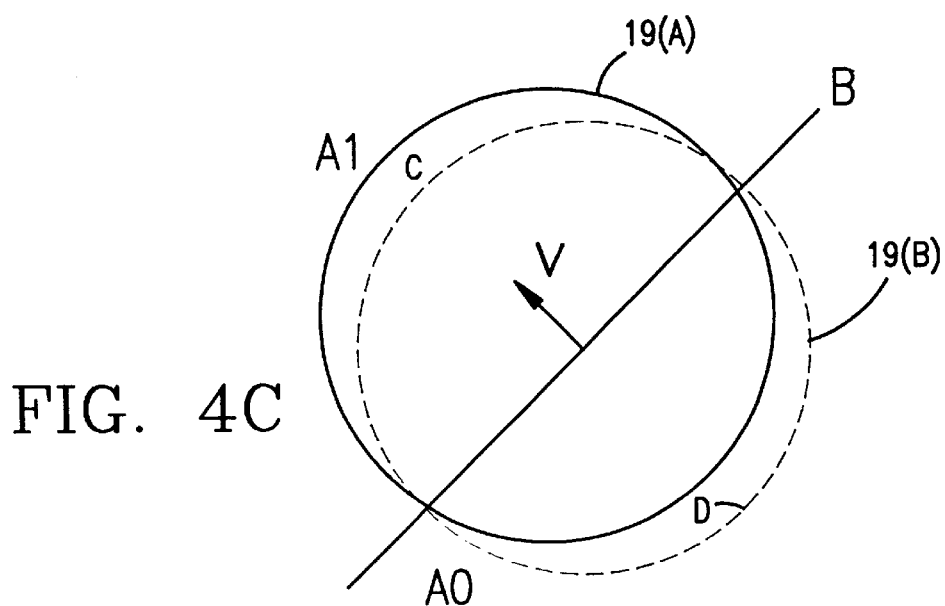
FIG. 4C illustrates how the moving window is efficiently refreshed for each new position.

The old boundary area represented by D in FIG. 4C is removed from the sliding window in step 304, as it is outside the new boundary 19A, and old boundary area D is refreshed consistent with display detail outside of boundary 19A.

In the foregoing technique, excessive computer time is unnecessary for refreshing common areas which remain after a sliding window representing the magnified cursor has changed position, and only refreshing new areas added to the boundaries of the repositioned cursor is needed.

Thus, there has been described with respect to one embodiment of the invention a process for changing the parameters within a sliding window such as a magnified cursor. This process may be incorporated as a set of instructions to be executed with the magnifiable cursor instructions loaded into the computer 11. The instructions may be entered by way of a conventional floppy disk, so they are stored within the hard drive of computer 11 and available at any time the magnifiable cursor is invoked by the user.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. In a computer display system for displaying an image and a magnified portion within said image, a method for changing characteristics of said magnified portion comprising:

displaying an image;

invoking a configuration routine to display a magnifiable cursor within said image, wherein said image and said magnifiable cursor are concurrently displayed, said magnifiable cursor displaying a magnified portion of said image;

positioning said magnifiable cursor along any path within said image, to a desired location, in response to motion of a pointing device;

invoking a configuration utility which includes a menu of display properties for said magnified portion, said magnified portion having a boundary which defines a sliding window within said image;

selecting said properties for said magnified portion; and refreshing only said magnified portion of said image with said selected properties, wherein said magnified portion is only refreshed when a velocity of said cursor is detected to be at or below a specified threshold value.

2. The method according to claim 1 wherein said properties include one of:

a text font;

a text size;

a text color; or a background color.

3. The method according to claim 1 wherein said magnified portion is refreshed each time said magnified portion is positioned on said display screen.

4. The method according to claim 3 wherein said step of refreshing the magnified portion includes the substeps of:

determining change of position of said cursor; and refreshing only those areas of said magnified portion within said display image which have been affected by said change of position.

5. The method according to claim 1 wherein said configuration utility is invoked by user before movement of said cursor and magnified image portion.

6. The method according to claim 1 wherein said menu having said properties is invoked from a signal produced from a mouse button.

7. The method according to claim 1 further comprising selecting each of said properties from a plurality of submenus.

8. A computer readable medium containing a plurality of instructions for executing the process of changing the properties of a magnified portion with a computer display image and process, comprising:

displaying an image;

invoking a configuration routine to display a magnifiable cursor within said image, wherein said image and said magnifiable cursor are concurrently displayed, said magnifiable cursor displaying a magnified portion of said image;

positioning said magnifiable cursor along any path within said image, to a desired location, in response to the motion of a pointing device;

invoking a configuration utility which includes a menu of display properties for said magnified portion, said magnified portion having a boundary which defines a sliding window within said image;

selecting said properties for said magnified portion; and refreshing only said magnified portion of said image with said selected properties, wherein said magnified portion is only refreshed when a velocity of said cursor is detected to be at or below a specified threshold value.

9. The computer readable medium of claim 8 further comprising instructions for invoking said configuration utility in response to a user entered command.

10. The computer readable medium according to claim 9 further comprising instructions for executing a process for recognizing a mouse button actuation as said user entered command.

11. The computer readable medium according to claim 8 further comprising instructions which create a pull down menu for selecting said properties when said configuration utility is invoked.

* * * * *